(12) United States Patent
Coffey

(10) Patent No.: US 7,252,801 B2
(45) Date of Patent: Aug. 7, 2007

(54) **METHOD FOR CONTROLLING *LEGIONELLA* IN COOLING TOWERS**

(76) Inventor: John Innes Coffey, 139 Belford Road, East Kew, Victoria 3102 (AU)

( * ) Notice: Subject to any disclaimer, the term of this patent is extended or adjusted under 35 U.S.C. 154(b) by 0 days.

(21) Appl. No.: 10/495,435

(22) PCT Filed: Nov. 25, 2002

(86) PCT No.: PCT/AU02/01584

§ 371 (c)(1),
(2), (4) Date: Jul. 12, 2004

(87) PCT Pub. No.: WO03/045849

PCT Pub. Date: Jun. 5, 2003

(65) Prior Publication Data

US 2005/0089441 A1 Apr. 28, 2005

(30) Foreign Application Priority Data

Nov. 27, 2001 (AU) .................... PR9147

(51) Int. Cl.
*A61L 2/04* (2006.01)
(52) U.S. Cl. ..................... 422/38; 210/764
(58) Field of Classification Search ........... 422/38, 422/636, 764; 210/636, 764
See application file for complete search history.

(56) References Cited

U.S. PATENT DOCUMENTS

| 1,983,109 | A | * | 12/1934 | Warren et al. ............... 134/3 |
| 3,530,000 | A | * | 9/1970 | Searles ................. 134/22.19 |
| 5,152,026 | A | * | 10/1992 | Scarpine ................... 15/1.7 |
| 5,476,670 | A | * | 12/1995 | Hight et al. ............... 424/661 |
| 6,255,331 | B1 | * | 7/2001 | El A'mma et al. ......... 514/372 |
| 6,417,211 | B1 | * | 7/2002 | Petigard et al. ............ 514/372 |
| 2002/0050478 | A1 | * | 5/2002 | Talbert et al. ............. 210/742 |

FOREIGN PATENT DOCUMENTS

| EP | 0391508 | | 10/1990 |
| GB | 2230256 | | 10/1990 |
| GB | 2230256 A | * | 10/1990 |
| JP | 137156 A | * | 5/1989 |
| JP | 08117757 A | * | 5/1996 |
| WO | 9102935 | | 3/1991 |

* cited by examiner

*Primary Examiner*—Gladys J P Corcoran
*Assistant Examiner*—Sean E. Conley
(74) *Attorney, Agent, or Firm*—Dennison, Schultz & MacDonald

(57) ABSTRACT

A method of controlling *Legionella* bacteria in cooling water systems is described. The method involves the heating of recirculating cooling water to temperatures of 70° C. for sufficient time to kill the bacteria. The method functions best in combination with chemical bactericides.

13 Claims, 2 Drawing Sheets

METHOD FOR CONTROLLING *LEGIONELLA* IN COOLING TOWERS

This application is a filing under 35 USC 371 of PCT/AU2002/001584 filed Nov. 25, 2002.

TECHNICAL FIELD

This invention relates to methods for controlling bacteria, in particular *Legionella*, in cooling towers.

BACKGROUND OF THE INVENTION

A respiratory disease was first identified in 1976 as being caused by a bacteria that was later named *Legionella pneumophila*. The disease was named Legionnaires' disease. Since then the disease has occurred in many locations throughout the world including Australia. A recent serious outbreak occurred at the Melbourne Aquarium in 2000 and deaths were reported from this outbreak. In this case cooling towers associated with the facility were identified as the source of the bacteria.

Although previously healthy people may contract the disease, those most at risk are patients undergoing treatment for cancer and other conditions which may render them immunosuppressed. Others at risk include smokers, heavy drinkers and persons with underlying medical conditions such as diabetes and chronic obstructive lung diseases. The mean age of those afflicted has been in the mid-fifties with males being more likely than females.

Transmission is believed to be by inhalation of contaminated aerosols. Infection is not believed to be caused by drinking *Legionella* contaminated water.

*L. pneumophila*, one of more than twenty currently recognised species in the genus *Legionella*, accounts for approximately 75 percent of the cases reported in Australia in the State of Victoria. There are currently fourteen recognised serogroups of *L. pneumophila*. Infection with other species, namely *L. bozemanii* and *L longbeachae*, has also occurred in Victoria. Strictly speaking, Legionnaires' disease is the term used for the disease caused by *L. pneumophila*, legionellosis refers to the disease caused by any species of *Legionella*. In this specification the term "Legionnaires' disease" will be used to refer to the pneumonic form of the disease caused by any species of *Legionella*.

Legionnaires' disease manifests as severe pneumonia, with patients presenting with early symptoms of malaise, muscle pains, headache and fever with drenching sweats. Within the first week, a cough, usually dry, develops. This occasionally is accompanied with bloodstained sputum. The patients become increasingly short of breath and the respiratory symptoms progress to pneumonia, often culminating in respiratory failure. There is usually a multi-system involvement, with mental confusion and delirium, diarrhoea, vomiting and renal failure. The disease usually has an incubation period of two to ten days. In the treatment of Legionnaires' disease, erythromycin is usually the drug of first choice, with the possible addition of rifampicin in non-responding cases.

Bacteria in the genus *Legionella* are widely distributed and are natural inhabitants of waters. They have been found in lakes, rivers, creeks and other bodies of water. Other bacteria and algae can provide nutrients for *Legionella* and may themselves cause health problems if aerosols containing such bacteria or algae are inhaled.

As set out previously, the route of human infection is considered to be by the inhalation of aerosols containing *Legionella*. Aerosols of five microns diameter or less are particularly effective at penetrating to the lower human respiratory tract. Several of the bacteria in aerosols are reported to be at a maximum at around 65 percent relative humidity. The risk of acquiring infection by *Legionella* increases with the number of bacteria deeply inhaled and, therefore, with the proliferation of these bacteria in the water source and the extent to which they are dispersed in aerosols of suitable size.

Aerosols may be generated during the normal operation of cooling towers.

Cooling towers are provided in some air conditioning systems to remove the heat rejected by the chiller(s). They are also used for removing heat generated in many industrial processes including refrigeration of air and liquids. In this specification we refer to these collectively as fluids. Typically, water is circulated from a basin via a heat exchanger to the top of the tower where it sprays or falls through a structure which is designed to create an extensive wetted surface area through which air passes. The movement of the air causes evaporative cooling of the water. In this specification the term cooling tower includes cooling towers of all configurations and includes heat rejecting equipment where water is circulated from a reservoir and sprays or falls over heated material. It involves air movement and evaporative cooling of the water.

In this specification the term chiller(s) means all equipment that rejects heat to cooling water and cooling tower systems. In this specification the term cooling water includes condenser water.

In operation, the cooling water gains heat from chillers or other heat exchanger source, and in the process of being distributed over the tower, loses heat to the moving air through evaporative cooling and convective and conductive heat exchange. The mode of airflow is usually forced in commercial systems but by forced and/or convection for industrial plants.

In the operation of all cooling towers, water is lost through evaporation, bleed-off and drift. Drift is the portion of the circulating water entrained in the cooling tower discharge as very small droplets or aerosol. These are produced within the tower by water impacting on the tower fill and also by the water distribution system. The airflow may entrain the smaller droplets and carry them through the tower. To minimise the drift loss, eliminators are frequently located before the tower discharge. Water lost by the above processes is provided by make up water which is usually delivered directly to the cooling tower reservoir or basin. The quantity of make up water is normally one of the order of percent of the flow rate of the recirculating cooling water.

To maximise the effective life of the cooling tower and associated equipment, it has been standard practice for decades to chemically treat the circulating water. Corrosion inhibitors are used to minimise the corrosion of metal surfaces. Surfactants, biocides and other chemicals are used to control fouling due to scale, silt and microbial growths in order to maintain efficient heat transfer at heat transfer surfaces, ensure free flow of water throughout the system, and prevent the proliferation of certain microorganisms which are responsible for surface corrosion and degradation. Biocides must come into contact with the microorganisms to ensure adequate control. Particulate matter, scale, debris, slimes and the presence of other microorganisms such as protozoa have the potential to shield *Legionella* from biocides and this may result in their persistence and proliferation if biocide levels fall or the *Legionella* are shielded. Since the increased awareness of Legionnaires' disease potential from cooling towers, there has been an increased use of biocides as a control method.

A major deficiency of the majority of biocides is the lack of a simple on-site test to determine and continuously monitor their concentration in cooling water. Consequently, initial biocidal concentration is commonly determined by calculation based on the estimated water volume of the system and the weight of biocide added. Further disadvantages of the reliance upon biocides are their high cost, handling hazards for operators and adverse environmental effects, particularly in aerosol form and discharges to sewer. Additionally, there is the potential problem that bacteria may develop resistance necessitating the use of new, more potent biocides or combination of biocides. Furthermore, in practice a common reaction to reduce the risk of Legionella is to dose more frequently. The potential hazards from such high levels of chemicals in aerosol form has not be assessed.

The approach to treating cooling towers to date has included compulsory registration, determining existing locations of all cooling towers, development of risk management plans, plus application of compulsory cleaning and chemical treatment standards and regimes.

Another approach has been to avoid the use of cooling towers. Alternative engineering solutions are available that use air cooled chillers or air cooled heat exchangers. However, the operation of these chillers and air cooled heat exchangers involves significant additional costs because of high electricity or other energy usage and demand. The additional energy costs of air cooled chillers may be typically 30% over the energy cost of a cooling tower system. It is desirable for systems to be energy efficient and allow designers to select lowest life cycle cost alternatives. While the capital costs are not greatly different for a new installation, retrofit into existing systems would usually involve substantial additional costs.

A novel approach to disinfecting Legionella is disclosed in WO91/02935. In this patent application a method is described where the coolant water in a collection tank that forms part of a cooling tower is heated to a temperature to kill the unwanted bacteria for a period of four hours each month. Such a system does not appear to have been commercialised and it is considered that such a treatment is not sufficiently efficacious. In the system of this disclosure, one of the shortcomings is that it does not address the problem of bacteria in the heat rejection equipment. The operation of the system also teaches that monthly treatment will control the bacteria levels between treatments. In practice it is believed that bacteria levels can significantly increase over periods of days or weeks. Additionally, the system of this disclosure is only suitable for use where the heat rejecting plant and cooling water system can be shut down during the time of treatment. Increasingly cooling towers are required to be available to support chillers operating on a 24 hour basis.

Another novel approach is described in WO 90/02707. This prior art discloses a building cold water system including cooling tower make up water where the make up water is pasteurised. However, this invention does not address the issue of recirculated water from cooling towers which, as discussed previously, constitutes the vast majority of the water in the system. The make up water normally represents only approximately 1% of the recirculating cooling water. It is the recirculated water that is believed to contribute most to the undesired bacteria. Only a very minor amount of undesired bacteria is believed to be sourced from the inlet water.

It would be desirable to have a method of controlling Legionella in cooling towers without being solely dependent on high levels of biocides.

SUMMARY OF THE INVENTION

In one form the invention provides a method of controlling Legionella by operating a cooling water system for a fluid conditioning plant by at least every 10 days heating the recirculating cooling water to an elevated temperature of at least 60° C. for a predetermined time, wherein heat sensitive heat rejecting equipment is isolated from the heated recirculating cooling water.

Preferably the elevated temperature at least 65° C.
Preferably the elevated temperature at least 70° C.
Preferably the elevated temperature is in the range 70 to 80° C.
Preferably the predetermined time is at least 5 seconds when the elevated temperature is at least 70° C.
Preferably the predetermined time is at least 30 minutes.
Preferably the predetermined time is at least 60 minutes.
Preferably the frequency of heating is at least once in every 24 hours
Preferably water in the isolated heat rejecting equipment is treated with preselected high doses of antibacterial chemicals, the doses being selected such that when the heat rejecting equipment is not isolated, the dosage level in the overall cooling water system is in the desired range.

In an alternative form the invention provides a method of controlling Legionella by operating a cooling water system for a fluid conditioning plant by heating the recirculating cooling water to an elevated temperature of at least 60° C. for a predetermined time by means of a bypass heating system whereby a minor portion of the recirculating cooling water is heated to the elevated temperature for a predetermined period of time.

Preferably the minor portion of the recirculating cooling water is less than 5%, and more preferably less than 1%.

Preferably the first and second alternative forms of the invention are used in combination.

Preferably the method of controlling Legionella in a cooling water system for a fluid conditioning plant also includes maintaining the temperature of the cooling water as close as practical to the ambient wet bulb temperature when the cooling water is not required for cooling, thereby minimising the growth of Legionella bacteria. This method may be combined with the first and/or second alternative forms of the invention.

DETAILED DESCRIPTION OF THE INVENTION

The use of low temperatures for part of the cycle reduces the multiplication of the bacteria. The cycle involves the operation of the cooling water system without chiller heat release to consistently reduce the temperature of the cooling water when not required for heat rejection. The operation of the cooling water system at temperatures close to the ambient wet bulb temperature is carried out after the operation of the chiller, that is when the chiller is not operating. This can be most readily achieved by the operation of cooling water system after chiller operations have ceased and at the colder times of the day.

The object of the above is to keep the cooling water as cool as is practical when not required for cooling the chiller or other equipment. We have found these conditions reduce the rate of growth of *Legionella*.

The attainment of temperatures in excess of 60° C. involves a heating source. This is usually most cost effectively achieved by using the normal hot water heater used to heat the building or process. Where available, steam, desuperheaters and waste process heat or other heat sources may be utilised. A bypass system may be used to prevent overheating of heat rejecting equipment/chiller. Appropriate fail safe systems would be normally employed. For example, control systems may be used to avoid the overheating of refrigerant during the heated cycle. To reduce the bacteria levels in the heat rejecting equipment/chillers during the heating cycle we have found it beneficial to include conventional biocides. These may be used at much higher levels than normal as the volume of water in the heat rejecting equipment/chiller is much less than the total volume of recirculating cooling water. Levels typically 5 or 10 times higher than normal may be used and these higher levels are considerably more effective in killing the bacteria in the heat rejecting equipment/chiller.

Figure 1:
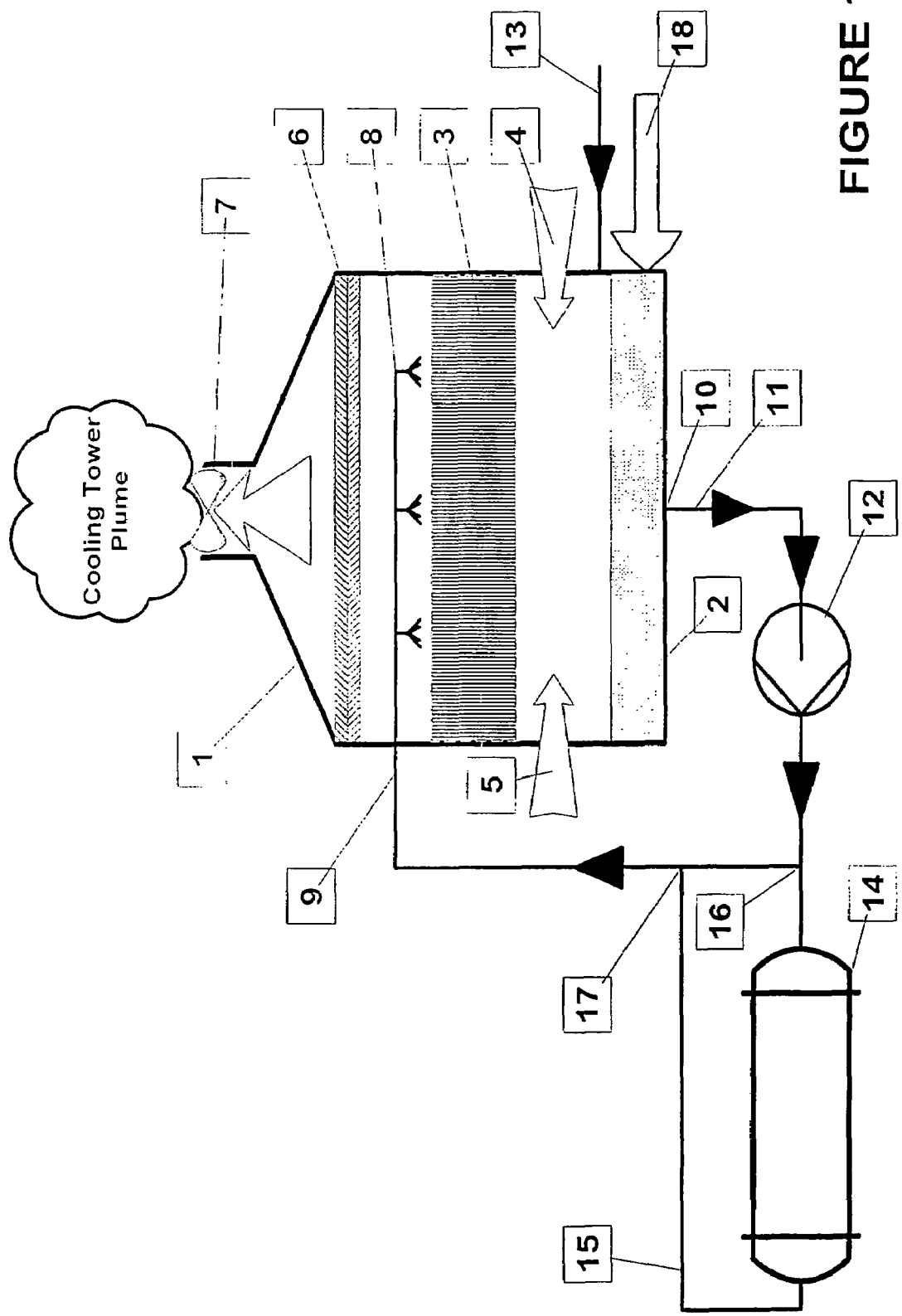
FIG. 1 is a schematic diagram of the process of the invention.

Referring to FIG. 1, a cooling tower 1 is shown with a water basin 2 at the base of the cooling tower 1. The cooling tower 1 has high temperature tower fill material 3, air inlets 4, 5, drift eliminators 6, tower fans 7, and water distributors 8. The water distributors 8 are fed by a cooling water pipe 9. A water basin outlet 10 is connected by pipe 11 and pump 12 and in turn to the cooling water pipe 9. Make up water is piped 13 to the water basin 2. Heat rejection equipment 14 is located in a looped pipeway 15 with appropriate valve control 16, 17 to allow isolation of this equipment during the heating cycle. Heat 18 is introduced into the recirculating water during the cleansing cycle. The heat rejecting equipment 14 is able to be dosed with relatively high levels of bactericides and with suitable recirculating equipment kills undesired bacteria in this equipment which is isolated from the heat cleansing equipment. During normal operation and in combination with this heating cycle the recirculating cooling water may be cooled when possible to reduce the temperature of the water in the basin to temperatures less than 20° C. This reduces the multiplication of the bacteria. The operation of this system also controls the population of other undesired bacteria and algae. The application of the technology described above would be applicable to all fluid conditioning systems that do not operate on a 24 hour basis.

Alternatively, chillers with dedicated cooling towers may be utilised to facilitate the heating cycle on one or more units while cooling is continued on the other(s). These systems could also be used on systems that operate on a 24 hour basis.

Effective control of *Legionella* was able to be achieved with conventional levels of biocides by heating the cooling water in a cooling water tower for 5 minutes at 70° C. once in every 24 hours. Temperature monitoring and control were able to be achieved easily and this included the capability of remote monitoring of the operation of the system.

Figure 2:
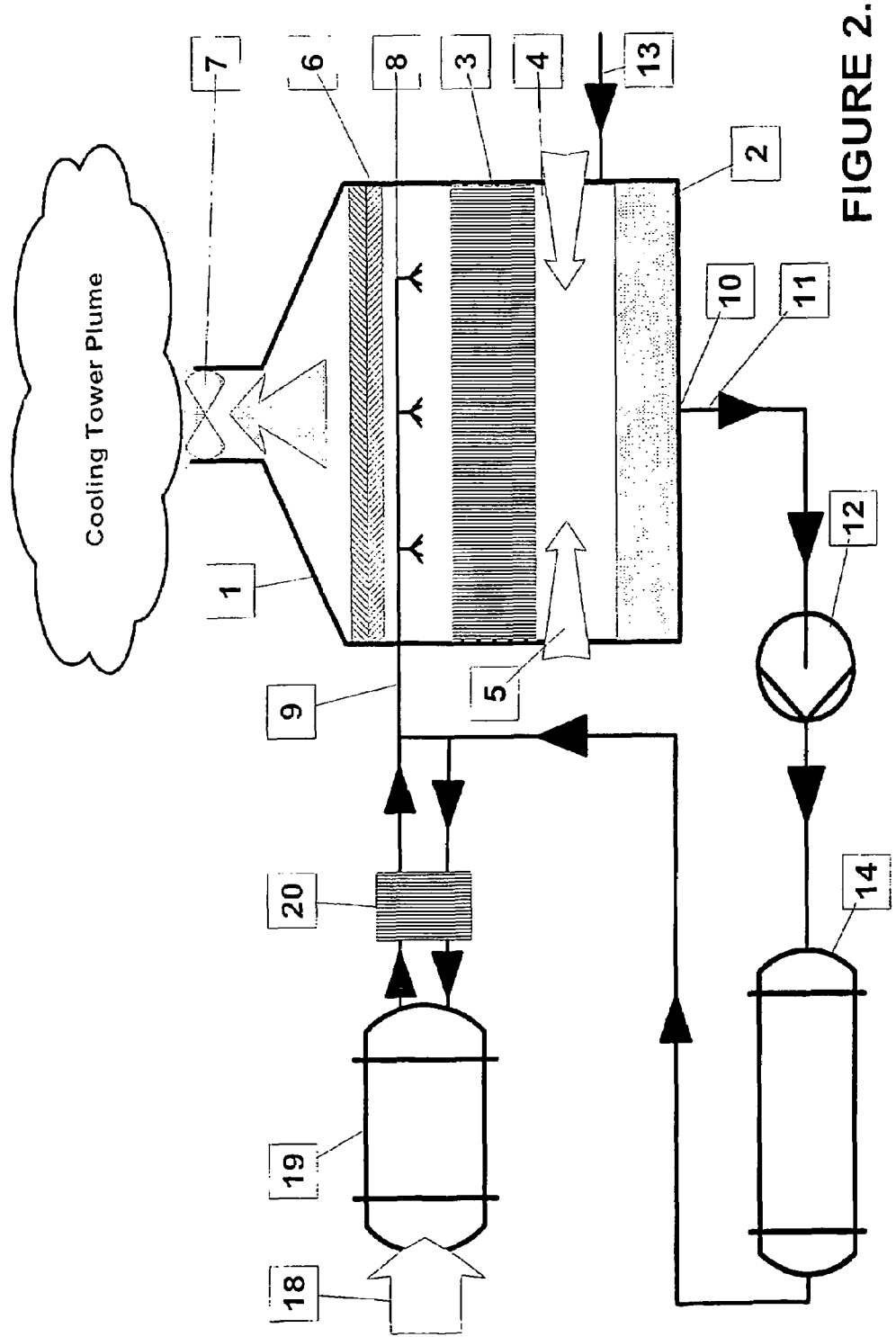
FIG. 2 is a schematic diagram of an alternative form of the invention.

Referring to FIG. 2, in this embodiment the heat rejection equipment 14 is not isolated from the recirculating cooling water. The recirculating cooling water is heated by a bypass heater and held in a holding tank 19 and preheater heat exchanger 20. The preheater 20 is optional but is preferred as it increases the efficiency of the operation of the system.

The heating process may also be achieved by utilising waste heat, heat from desuperheaters or other sources. This system is suitable for intermittent and continuous use.

The processes of the invention would also usually involve automated controls to action and control the low and high temperature cycles. Monitoring equipment to demonstrate that the cycles had been completed satisfactorily would be included as part of a quality assurance requirement The present invention also includes the operation of cooling water system such that the cooling and heating cycles are sequentially combined. While the present invention includes the control of *Legionella* without reliance on biocides, these materials may be used to augment the efficacy of the cooling water and/or heating system and these are our preferred systems. Although the present invention has been described with reference to cooling towers for air conditioning, it is also applicable to other community, commercial and industrial situations where there is potential for aerosols with *Legionella* infected water suppliers.

Since modifications within the spirit and scope of the invention may be readily effected by persons skilled in the art, it is to be understood that the invention is not limited to the particular embodiment described, by way of example, hereinabove.

The invention claimed is:

1. A method of controlling *legionella* in an operating cooling water system for a fluid conditioning plant comprising the steps of:
   recirculating cooling water in the system through a bypass heating system, and
   heating the recirculating water in the bypass heating system to an elevated temperature of at least 60° C. for a predetermined period of time,
   wherein the water in the bypass heating system comprises less than 5% of the water in the cooling water system.

2. A method as defined in claim 1 wherein the water in the bypass heating system is less than 1% of the water in the cooling water system.

3. A method as defined in claim 1 wherein the elevated temperature is at least 70° C.

4. A method as defined in claim 1, further comprising isolating heat sensitive heat rejecting equipment from recirculating cooling water.

5. A method as defined in claim 1, further comprising, at least every 10 days:
   isolating heat sensitive heat rejecting equipment from recirculating cooling water,
   heating the recirculating cooling water from which the heat sensitive heat rejecting equipment has been isolated to an elevated temperature of at least 60° C. for a predetermined time, and
   dosing the cooling water in the heat sensitive heat rejecting equipment with bactericide during said isolating.

6. A method as defined in claim 5 wherein the elevated temperature of the recirculating cooling water from which the heat sensitive heat rejecting equipment has been isolated is at least 65° C.

7. A method as defined in claim 5 wherein the elevated temperature of the recirculating cooling water from which the heat sensitive heat rejecting equipment has been isolated is at least 70° C.

8. A method as defined in claim 5 wherein the elevated temperature of the recirculating cooling water from which the heat sensitive heat rejecting equipment has been isolated is at least 70 to 80° C.

9. A method as defined in claim 5 wherein the predetermined time of the elevated temperature of the recirculating cooling water from which the heat sensitive heat rejecting equipment has been isolated is at least 5 seconds when the temperature is at least 70° C.

10. A method as defined in claim 5 wherein the predetermined time of the elevated temperature of the recirculating cooling water from which the heat sensitive heat rejecting equipment has been isolated is at least 30 minutes.

11. A method as defined in claim 5 wherein the predetermined time of the elevated temperature of the recirculating cooling water from which the heat sensitive heat rejecting equipment has been isolated is at least 60 minutes.

12. A method as defined in claim 5 wherein the frequency of heating of the elevated temperature of the recirculating cooling water from which the heat sensitive heat rejecting equipment has been isolated is at least once in every 24 hours.

13. A method as defined in claim 5 including maintaining the temperature of the cooling water as close as practical to the ambient wet bulb temperature when the cooling water is not required for cooling, thereby minimizing the growth of *Legionella* bacteria.

* * * * *